US011863926B2

(12) United States Patent
Guo et al.

(10) Patent No.: US 11,863,926 B2
(45) Date of Patent: Jan. 2, 2024

(54) HEADSET KIT

(71) Applicant: Yibai Science & Technology (Shenzhen) Co., Ltd., Shenzhen (CN)

(72) Inventors: Changming Guo, Shenzhen (CN); Hongchao Zhou, Shenzhen (CN)

(73) Assignee: Yibai Science & Technology (Shenzhen) Co., Ltd., Shenzhen (CN)

( * ) Notice: Subject to any disclaimer, the term of this patent is extended or adjusted under 35 U.S.C. 154(b) by 314 days.

(21) Appl. No.: 17/477,561

(22) Filed: Sep. 17, 2021

(65) Prior Publication Data

US 2022/0007102 A1 Jan. 6, 2022

Related U.S. Application Data

(63) Continuation of application No. PCT/CN2019/083910, filed on Apr. 23, 2019.

(30) Foreign Application Priority Data

Apr. 2, 2019 (CN) ......................... 201920440174.8

(51) Int. Cl.
*H04R 1/10* (2006.01)

(52) U.S. Cl.
CPC ......... *H04R 1/1016* (2013.01); *H04R 1/1025* (2013.01); *H04R 2420/07* (2013.01)

(58) Field of Classification Search
CPC . H04R 1/1016; H04R 1/1025; H04R 2420/07
USPC .......................................................... 381/74
See application file for complete search history.

(56) References Cited

U.S. PATENT DOCUMENTS

| | | | | |
|---|---|---|---|---|
| 10,701,472 | B1 * | 6/2020 | Xu | H02J 7/0044 |
| 10,750,268 | B2 * | 8/2020 | Dang | H02J 50/05 |
| 2017/0094399 | A1 * | 3/2017 | Chandramohan | H04R 5/033 |
| 2019/0069066 | A1 * | 2/2019 | Song | E05C 19/16 |

FOREIGN PATENT DOCUMENTS

| | | | |
|---|---|---|---|
| CN | 207766003 | U | 8/2018 |
| CN | 108810704 | A | 11/2018 |
| CN | 208158826 | U | 11/2018 |
| EP | 2395623 | A2 | 12/2011 |

* cited by examiner

*Primary Examiner* — Sean H Nguyen
(74) *Attorney, Agent, or Firm* — Bayramoglu Law Offices LLC

(57) ABSTRACT

A headset kit includes at least one Bluetooth earphone, a charging base used for charging each Bluetooth earphone, and an upper cover connected with the charging base. Supporting grooves used for supporting a first side of the each Bluetooth earphone are formed in the charging base, and through holes used for a second side of the each Bluetooth earphone to extend into are formed in the upper cover.

10 Claims, 9 Drawing Sheets

HEADSET KIT

CROSS REFERENCE TO THE RELATED APPLICATIONS

This application is a continuation application of International Application No. PCT/CN2019/083910, filed on Apr. 23, 2019, which is based upon and claims priority to Chinese Patent Application No. 201920440174.8, filed on Apr. 2, 2019, the entire contents of which are incorporated herein by reference.

TECHNICAL FIELD

The present disclosure belongs to the technical field of earphone equipment, and more specifically, relates to a headset kit.

BACKGROUND

At present, a box body of Bluetooth wireless earphones usually adopts the four following modes: firstly, a cover-lifting mode: the box body is provided with a rotatable upper cover, the earphones are hidden in the box body, and the earphones are taken and placed by rotating the upper cover; secondly, a sliding mode: the box body is provided with a slidable upper cover, the earphones are hidden in the box body, and the earphones are taken and placed by sliding the upper cover; thirdly, a pulling mode: the pulling mode is similar to a drawer structure, so that the earphones are hidden; and fourthly, a rotary mode: the earphones are hidden in the box body through a rotatable upper cover.

In the technical problems, the four above modes have the following defects: firstly, because the earphones are hidden in the box body, the states of the earphones in the box body, such as whether the earphones exist in the box body or not, the charging amount of the earphones, the on-off states of the earphones and the like, cannot be visually known; and secondly, the existing earphone box body has a space layer, so that the thicknesses of the earphones and the box body are large, and the cost is high.

SUMMARY

The present disclosure aims to provide a headset kit to solve the problems that in the prior art, earphones are hidden in a box body, the states of the earphones cannot be visually known, and the thickness of the box body is large.

In order to achieve the above purpose, the technical scheme adopted by the present disclosure is to provide a headset kit, comprising:

at least one Bluetooth earphone;

a charging base used for charging each Bluetooth earphone; and an upper cover connected with the charging base and used for being matched with the charging base to support each Bluetooth earphone, wherein supporting grooves used for supporting one side of each Bluetooth earphone are formed in the charging base, and through holes used for the other side of each Bluetooth earphone to extend into are formed in the upper cover.

Further, positioning grooves for positioning and pressing each Bluetooth earphone at positions corresponding to the edges of the through holes are formed in the upper cover.

Further, the number of the Bluetooth earphones is two, the through hole is in a long strip shape, and the two ends of the through hole extend to the corresponding positions of the two Bluetooth earphones respectively.

Further, the number of the Bluetooth earphones is two, and the through holes are formed in the positions, corresponding to the Bluetooth earphones, of the upper cover respectively.

Further, the upper cover is detachably connected with the charging base, and an avoiding groove is formed in the edge of the charging base.

Further, each Bluetooth earphone comprises an earphone main body and an earphone arm connected with the earphone main body, and the supporting groove comprises a first accommodating groove for supporting each earphone main body and a second accommodating groove for supporting each earphone arm.

Further, the side surface, facing the upper cover, of the charging base is provided with a protrusion extending in the direction of the upper cover, and the second accommodating grooves are formed in the protrusion.

Further, an opening for the earphone main body to extend into is formed in the bottom surface of the first accommodating groove.

Further, the first accommodating groove communicates with the second accommodating groove, and the bottom surface of the first accommodating groove and the bottom surface of the second accommodating groove are located on the same plane.

Further, the headset kit further comprises a base plate with which one side of each opening is covered, and the base plate is connected with the charging base.

The present disclosure has the following beneficial effects:

According to the present disclosure, supporting grooves used for supporting one side of each Bluetooth earphone are formed in the charging base, through holes used for the other side of each Bluetooth earphone to extend into are formed in the upper cover, a user can observe the state of each Bluetooth earphone through the through hole, and the supporting effect of each Bluetooth earphone is good; and one side of each Bluetooth earphone extends into the through hole, so that the structure of a traditional space layer is cancelled, and the headset kit is small in thickness and low in cost.

BRIEF DESCRIPTION OF THE DRAWINGS

To describe the technical solutions in the embodiments of the present disclosure or in the prior art more clearly, the following briefly describes the attached figures required for describing the embodiments or the prior art. Apparently, the attached figures in the following description show merely some embodiments of the present disclosure, and a person of ordinary skill in the art may derive other drawings from these attached figures without creative efforts.

REFERENCE SIGNS IN THE ATTACHED FIGURES

Figure 1:
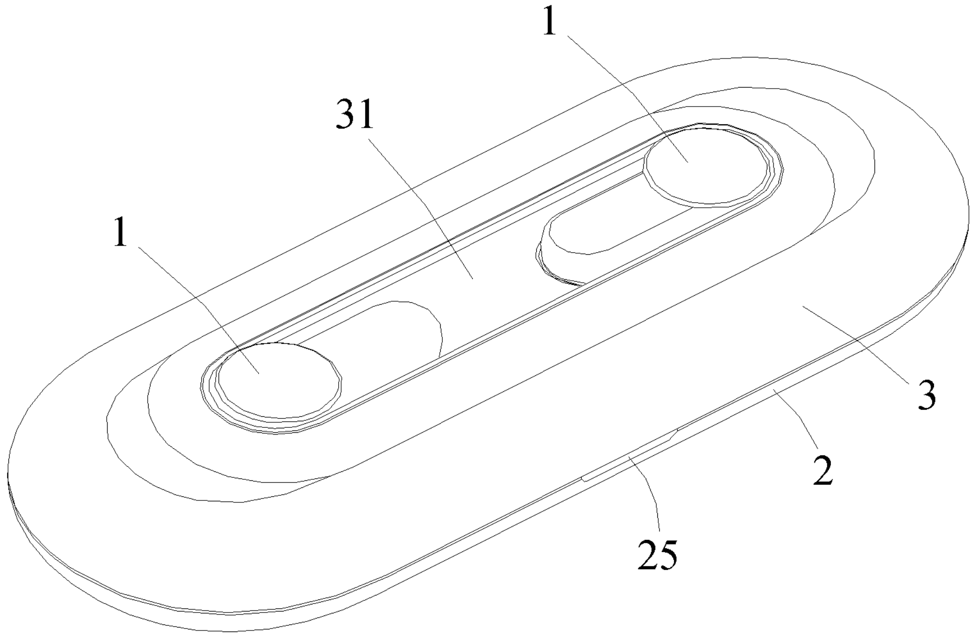
FIG. 1 is a structural schematic diagram of a headset kit provided by the first embodiment of the present disclosure.

1, Bluetooth earphone; 11, earphone main body; 12, earphone arm; 13, positive electric conductor; 14, negative electric conductor;

2, charging base; 21, supporting groove; 211, first accommodating groove; 212, second accommodating groove; 22, positive plate; 23, negative plate; 24, protrusion; 25, avoiding groove; 26, opening;

3, upper cover; 31, through hole; and

4, base plate.

DETAILED DESCRIPTION OF THE EMBODIMENTS

In order to make the technical problem to be solved, the technical scheme and the beneficial effects clearer, the present disclosure is further detailed in combination with the attached figures and the embodiment. It shall be understood that, the embodiments described herein are only intended to illustrate but not to limit the present disclosure.

It should be noted that when one element is referred to as being "fixed" or "arranged" on the other element, it can be directly on the other element or indirectly on the other element. When one element is referred to as being "connected" to the other element, it may be directly connected to the other element or indirectly connected to the other element.

In addition, the terms "first" and "second" are merely intended for a purpose of description, and shall not be understood as an indication or implication of relative importance or implicit indication of the number of indicated technical features. Therefore, a feature limited by "first" or "second" may include one or more features explicitly or implicitly. In the description of the present disclosure, the meaning of "a plurality of" means two or more unless expressly specifically defined otherwise.

In the description of the present disclosure, it needs to be illustrated that the indicative direction or position relations of the terms such as "center", "length", "width", "thickness", "upper", "lower", "front", "rear", "left", "right", "vertical", "horizontal", "top", "bottom", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

In the description of the present disclosure, it needs to be illustrated that, except as otherwise noted, the terms such as "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally or interact with each other. For those skilled in the art, the specific meanings of the terms in the present disclosure can be understood according to specific conditions.

Embodiment I

Referring to FIG. 1 to FIG. 4 together, a headset kit provided by the first embodiment of the present disclosure is described as follows. The headset kit comprises at least one Bluetooth earphone 1, a charging base 2 and an upper cover 3 connected with the charging base 2. Supporting grooves 21 used for supporting one side of each Bluetooth earphone 1 are formed in the charging base 2, through holes 31 used for the other side of each Bluetooth earphone 1 to extend into but not extend out are formed in the upper cover 3 correspondingly, and the supporting grooves 21 are at most flush with the open-end faces of the through holes 31. The charging base 2 is matched with the upper cover 3 to support and fix each Bluetooth earphones 1, and after the Bluetooth earphones 1 are connected with the charging base 2, the charging base 2 can charge the Bluetooth earphones 1. According to the structure, the state of each Bluetooth earphone 1 can be visually observed through the through holes 31, and user operation is facilitated.

Figure 2:
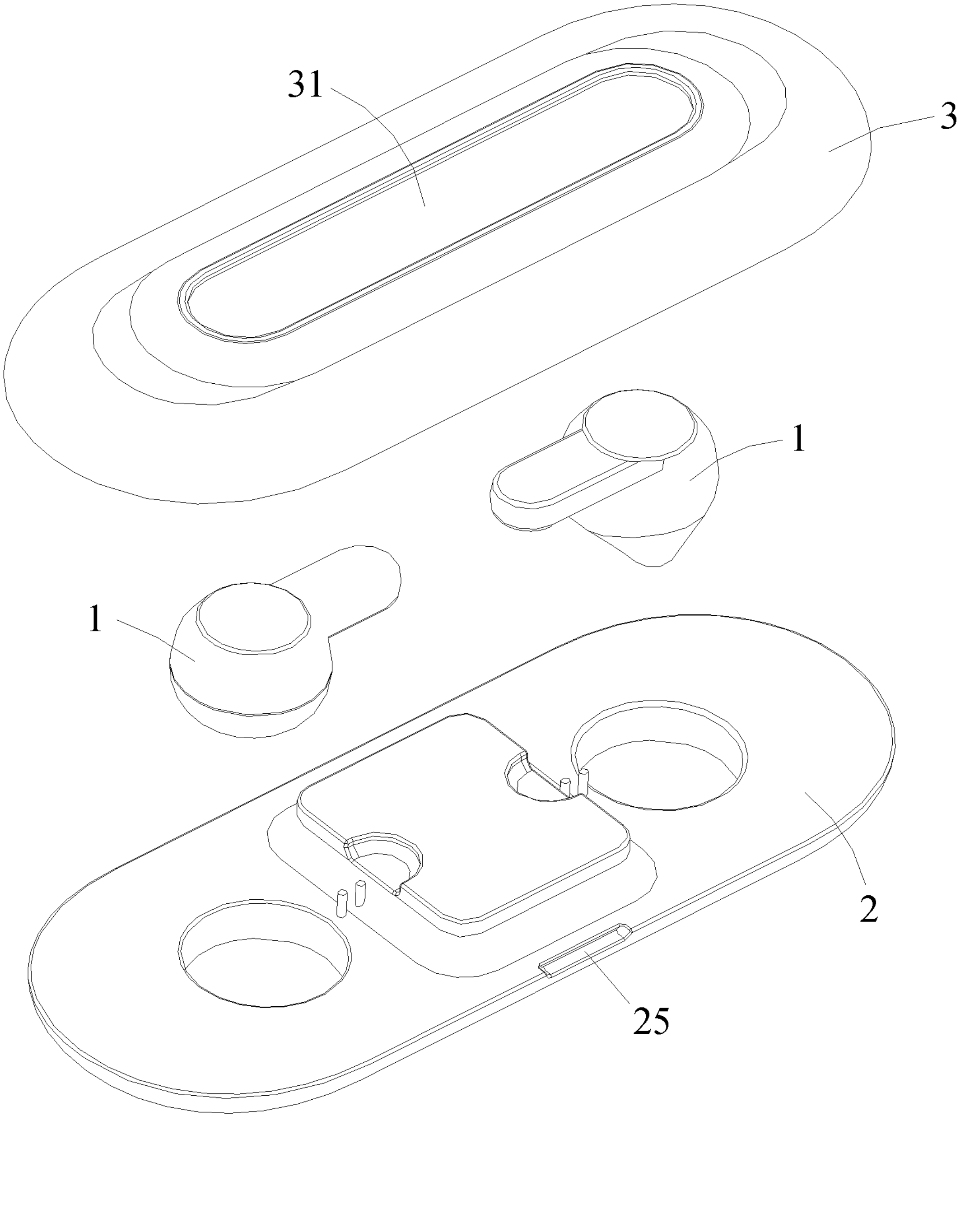
FIG. 2 is an explosive schematic diagram of a headset kit provided by the first embodiment of the present disclosure.
Figure 3:
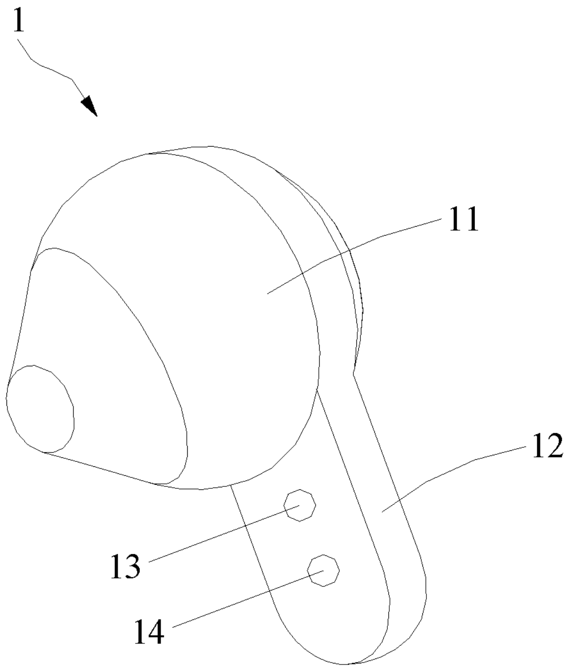
FIG. 3 is a structural schematic diagram of a Bluetooth earphone provided by the first embodiment of the present disclosure.

Further, referring to FIG. 2 together, as a specific embodiment of a headset kit provided by the first embodiment of the present disclosure, positioning grooves (uncharted) for positioning and pressing each Bluetooth earphone 1 at positions corresponding to the edges of the through holes 3 are formed in the upper cover 3. According to the structure, two sides of each Bluetooth earphone 1 can be effectively supported and fixed through the supporting grooves 21 and the positioning grooves.

Further, referring to FIG. 1 and FIG. 2 together, as a specific embodiment of a headset kit provided by the first embodiment of the present disclosure, the number of the Bluetooth earphones 1 is two, the through hole 31 is in a long strip shape, and the two ends of the through hole 31 extend to the corresponding positions of the two Bluetooth earphones 1 respectively. According to the structure, the two Bluetooth earphones 1 are arranged at intervals, and the through hole 31 is beneficial to heat dissipation of the interior of the charging base 2, so that the heat dissipation effect is improved; and a user can conveniently observe the interior of the charging base 2 through the through hole 31, so that the state of each Bluetooth earphone 1 can be visually known. In other embodiments, the number, shape and size of the Bluetooth earphone 1 and the through hole 31 can be adjusted according to actual production needs, and are not exclusively limited herein.

Further, referring to FIG. 1 and FIG. 2 together, as a specific embodiment of a headset kit provided by the first embodiment of the present disclosure, the upper cover is detachably connected with the charging base. Optionally, one end of the upper cover 3 can be hinged with the corresponding end of the charging base 2, the other end of the upper cover 3 can be clamped with the corresponding end of the charging base 2, and the upper cover 3 can rotate around one end of the charging base 2; and an avoiding groove 25 is formed in the edge of the charging base 2, so that the user can open the upper cover 3 conveniently, and the user can take and place the Bluetooth earphone 1 conveniently. In other embodiments, the upper cover 3 and the charging base 2 can be connected in other manners, and are not exclusively limited herein.

Figure 4:
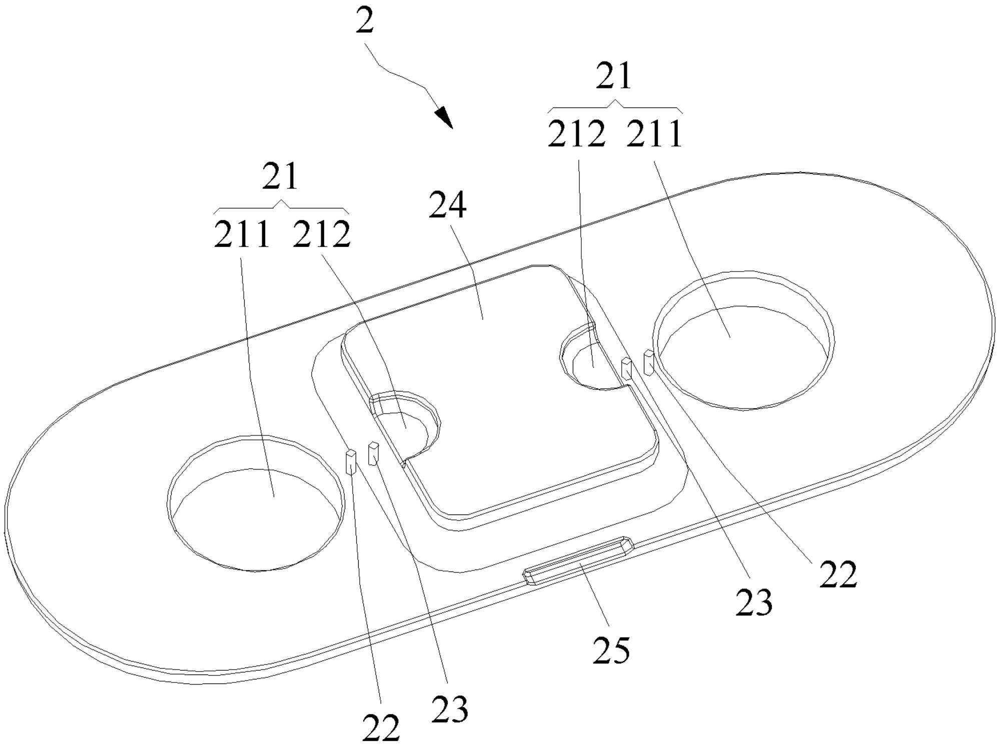
FIG. 4 is a structural schematic diagram of a charging base provided by the first embodiment of the present disclosure.

Further, referring to FIG. 4 together, as a specific embodiment of a headset kit provided by the first embodiment of the present disclosure, each Bluetooth earphone 1 comprises an earphone main body 11 and an earphone arm 12 connected with the earphone main body 11, and the supporting groove 21 comprises a first accommodating groove 211 for supporting each earphone main body 11 and a second accommodating groove 212 for supporting each earphone arm 12. According to the structure, the earphone main body 11 and the earphone arm 12 can be respectively supported through the first accommodating groove 211 and the second accommodating groove 212, and then the two ends of the Bluetooth earphone 1 can be respectively and effectively supported, so that the supporting effect of the charging base 2 on the Bluetooth earphone 1 is good, and charging alignment is accurate.

Optionally, a positive plate 22 and a negative plate 23 are mounted on the charging base 2, and a positive electric conductor 13 used for being connected with the positive plate 22 and a negative electric conductor 14 used for being connected with the negative plate 23 are mounted on each Bluetooth earphone 1. According to the structure, after each Bluetooth earphone 1 is placed in the supporting groove 21, the positive electric conductor 13 is connected with the positive plate 22, the negative electric conductor 14 is connected with the negative plate 23, at the moment, the Bluetooth earphone 1 electrically communicates with the charging base 2, and the charging base 2 can charge the Bluetooth earphone 1.

Optionally, springs (uncharted) can be sleeved on the positive plate 22 and the negative plate 23, the positive plate 22 and the negative plate 23 can stretch towards the interior of the charging base 2 when being subjected to extrusion force of the Bluetooth earphone 1, and the springs play a certain role in buffering, so that the reliability of connection between the Bluetooth earphone 1 and the charging base 2 is improved.

Optionally, integral injection molding for each earphone main body 11 and the corresponding earphone arm 12 is achieved. According to the structure, all the integrally formed Bluetooth earphones 1 have excellent mechanical properties, and the production and manufacturing efficiency is high. In other embodiments, the earphone main body 11 and the corresponding earphone arm 12 may be connected by other means such as bonding and snapping, without being exclusively limited herein.

Further, referring to FIG. 4 together, as a specific embodiment of a headset kit provided by the first embodiment of the present disclosure, the side surface, facing the upper cover 3, of the charging base 2 is provided with a protrusion 24 extending in the direction of the upper cover 3, and the second accommodating grooves 212 are formed in the protrusion 24. According to the structure, due to the fact that the earphone main body 11 and the earphone arm 12 of each Bluetooth earphone 1 are not of uniform and regular structures, a certain height difference exists between the in-ear position of the earphone main body 11 and the earphone arm 12. When the in-ear position of the earphone main body 11 is in contact with the bottom surface of the first accommodating groove 211, in order to make the earphone arm 12 in contact with the bottom surface of the second accommodating groove 212 at the same time, the height difference between the in-ear position of the earphone main body 11 and the earphone arm 12 can be made up through the protrusion 24, so that the first accommodating groove 211 and the second accommodating groove 212 can effectively support the earphone main body 11 and the earphone arm 12 respectively. Moreover, the user can conveniently take out the Bluetooth earphone 1 through fingers. Optionally, the protrusion 24 can be internally provided with a battery to supply power to each Bluetooth earphone 1, so that the space is fully utilized, and the product thickness is reduced.

Optionally, in one Bluetooth earphone 1, the positive electric conductor 13 and the negative electric conductor 14 are mounted on the earphone arm 12 respectively. According to the structure, the height difference exists between the in-ear position of the earphone main body 11 and the earphone arm 12, so that the distance exists between the earphone arm 12 and the bottom surface of the charging base 2, the connection between the positive electric conductor 13 and the positive plate 22 and the connection between the negative electric conductor 14 and the negative plate 23 are realized in the distance, the space utilization rate is improved, and the overall thickness of the headset kit can be reduced. In other embodiments, the positive electric conductor 13 and the negative electric conductor 14 may also be arranged at other positions. For example, the positive electric conductor 13 and the negative electric conductor 14 are arranged on the earphone main body 11, or the positive electric conductor 13 is arranged on the earphone main body 11 and the negative electric conductor 14 is arranged on the earphone arm 12, or the positive electric conductor 13 is arranged on the earphone arm 12 and the negative electric conductor 14 is arranged on the earphone arm 12. Adjustment can be performed according to actual production requirements, and is not only limited here.

Optionally, a display screen (uncharted) is arranged on the charging base 2 or the upper cover 3, and when the Bluetooth earphone 1 is connected with the charging base 2, the display screen can display the electric quantity of the Bluetooth earphone 1, and the display screen is not only limited. An indicating lamp (uncharted) can be arranged on the Bluetooth earphone 1, and when the Bluetooth earphone 1 works or is charged, the indicating lamp is turned on at the moment; otherwise, when the Bluetooth earphone 1 is stopped or not charged, the indicating lamp is extinguished.

According to the present disclosure, supporting grooves 21 used for supporting one side of each Bluetooth earphone 1 are formed in the charging base 2, through holes 31 used for the other side of each Bluetooth earphone 1 to extend into are formed in the upper cover 3, a user can observe the state of each Bluetooth earphone 1 through the through hole 31, and the supporting effect of each Bluetooth earphone 1 is good; and one side of each Bluetooth earphone 1 extends into the through hole 31, and the thickness of the upper cover 3 and the thickness of a space layer are omitted, so that the headset kit is small in thickness and low in cost. According to the present disclosure, the thickness of the product designed through the present disclosure can be reduced by 3-6 mm, and the product is smaller in thickness and convenient to carry.

Embodiment II

Referring to FIG. 5 to FIG. 8 together, a headset kit provided by the second embodiment of the present disclosure is described as follows. The difference between the second embodiment and the first embodiment lies in that an opening 26 for the ear-in end of the earphone main body 11 to extend into is formed in the bottom surface of the first accommodating groove 211. According to the structure, according to the second embodiment, one side of the Bluetooth earphone 1 extends into the through hole 31 and does not extend out of the through hole 31, and the other side of the Bluetooth earphone 1 extends into the opening 26 and does not extend out of the opening 26, so that the thickness of the upper cover 3 and the thickness of the space layer can be omitted, the overall thickness of the product designed through the present disclosure is reduced by 6-9 mm, and the product is smaller in thickness and convenient to carry.

Figure 8:
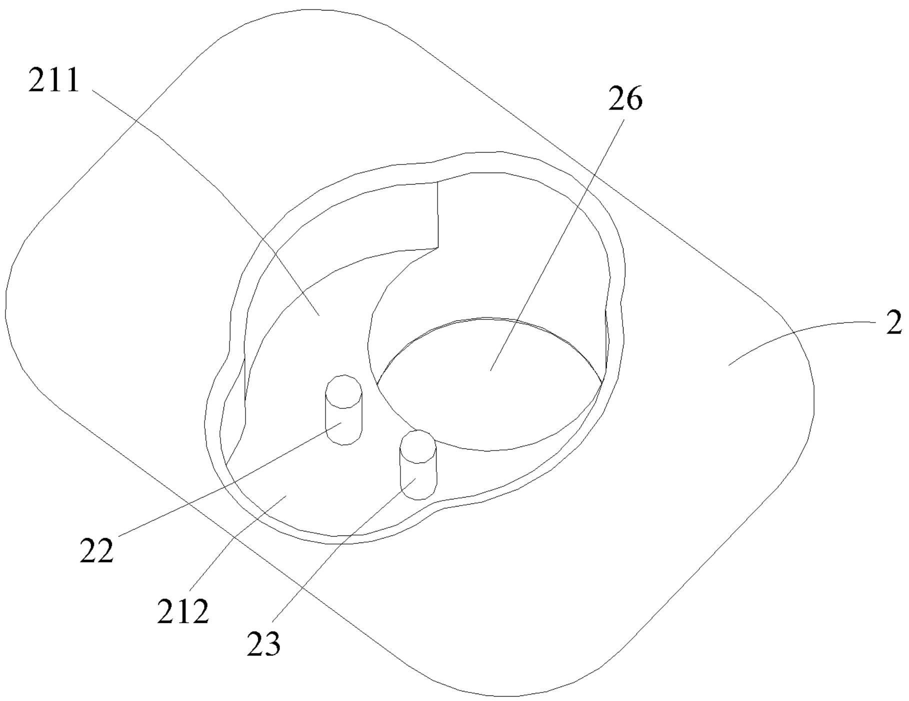
FIG. 8 is a structural schematic diagram of a charging base provided by the second embodiment of the present disclosure.
Figure 9:
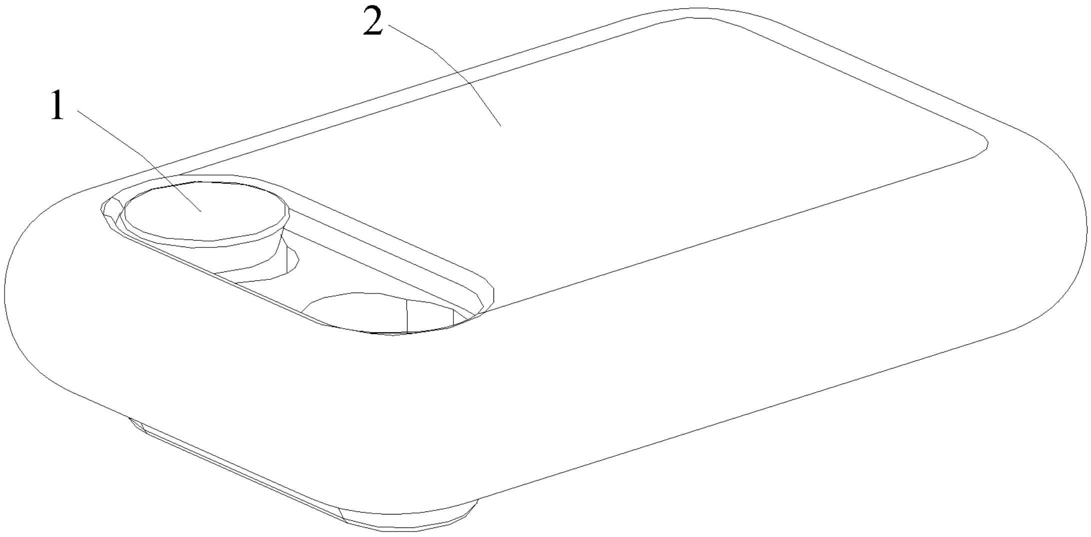
FIG. 9 is a structural schematic diagram of a headset kit provided by the third embodiment of the present disclosure.
Figure 10:
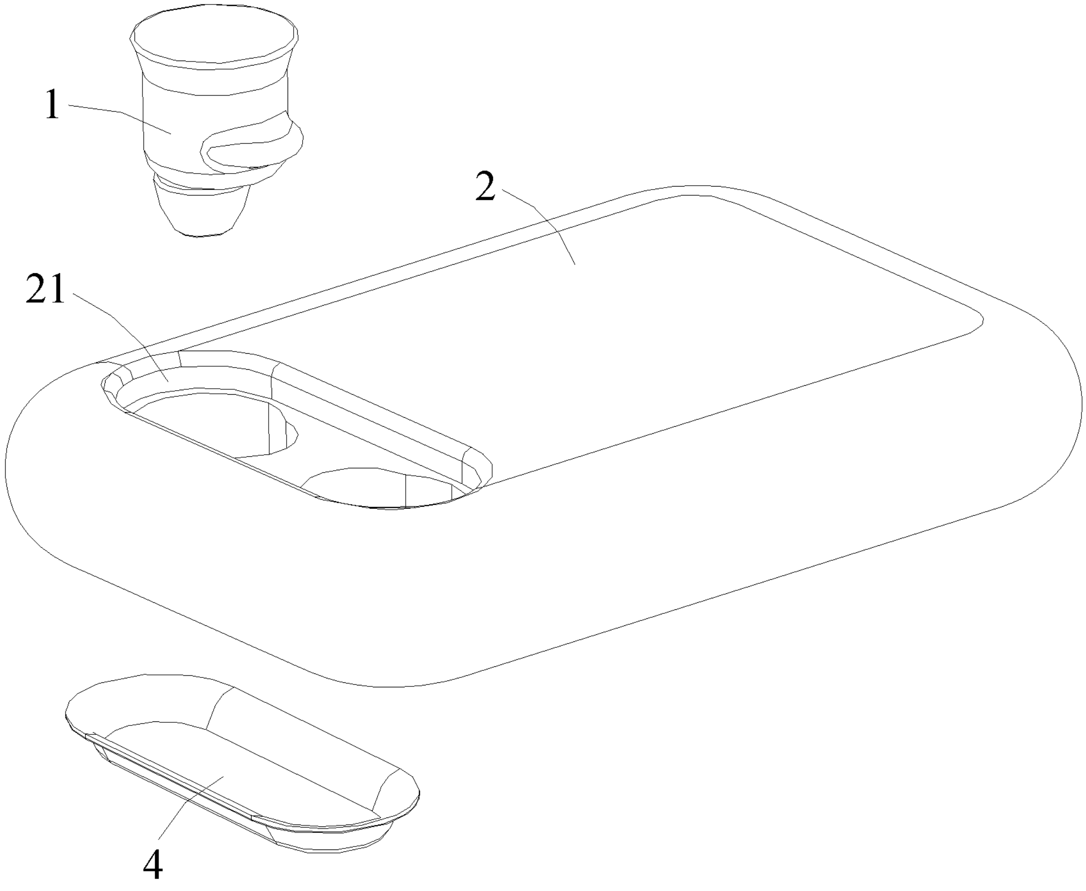
FIG. 10 is an explosive schematic diagram of a headset kit provided by the third embodiment of the present disclosure.
Figure 11:
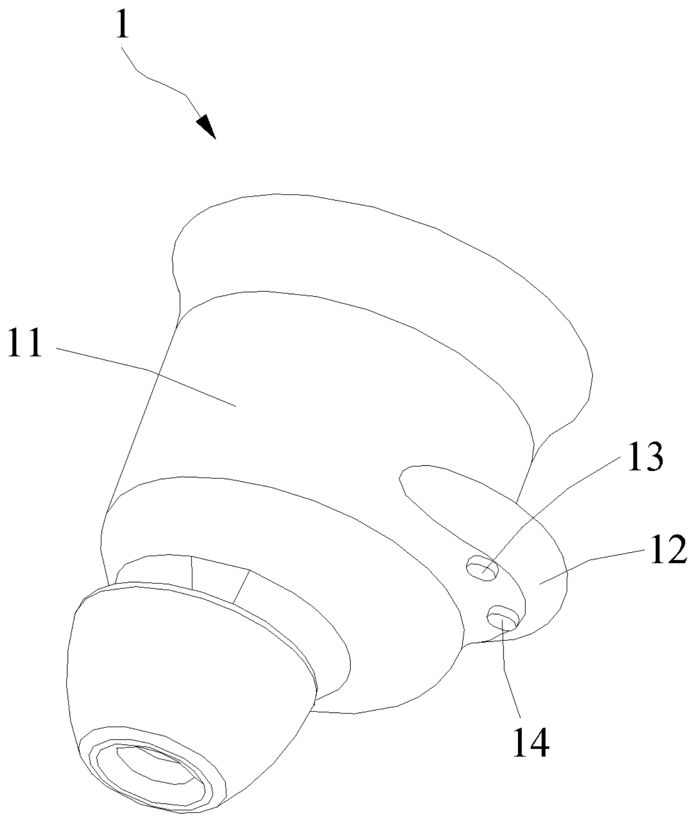
FIG. 11 is a structural schematic diagram of a Bluetooth earphone provided by the third embodiment of the present disclosure.
Figure 12:
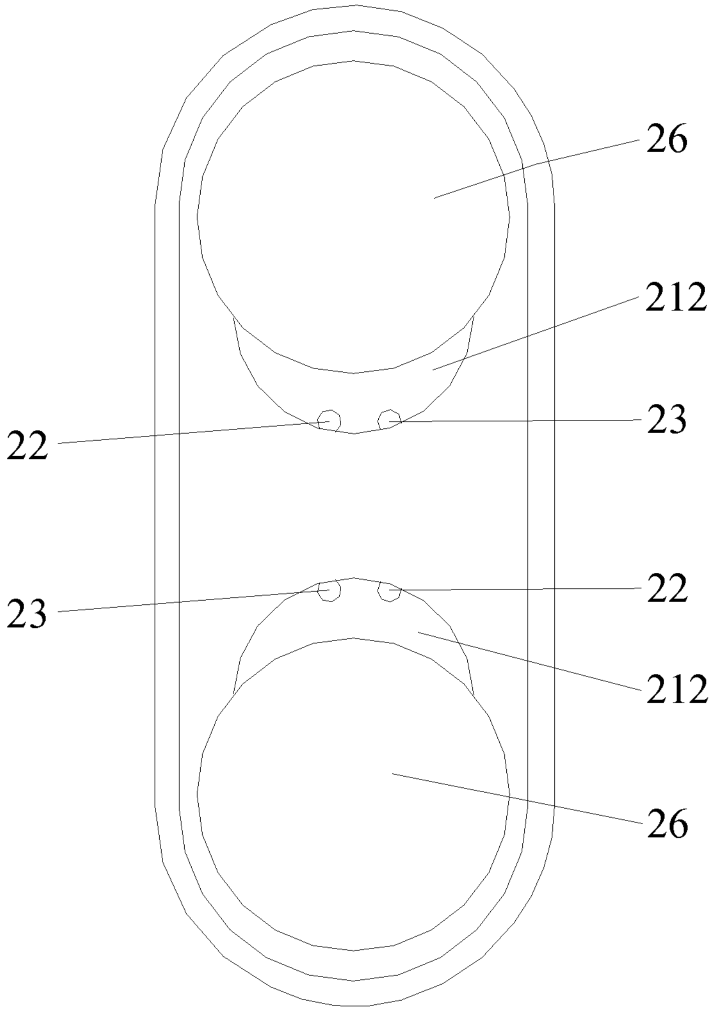
FIG. 12 is a top view of a charging base provided by the third embodiment of the present disclosure.

Further, referring to FIG. 8 together, as a specific embodiment of a headset kit provided by the second embodiment of the present disclosure, the first accommodating groove 211 communicates with the second accommodating groove 212, and the bottom surface of the first accommodating groove 211 and the bottom surface of the second accommodating groove 212 are located on the same plane. According to the structure, the structure of the protrusion 24 in the first embodiment is omitted, the first accommodating groove 211 communicates with the second accommodating groove 212, the structural design of the charging base 2 is simplified, the occupied space of the first accommodating groove 211 and the second accommodating groove 212 is reduced, and design of the headset kit with smaller thickness is facilitated.

Figure 5:
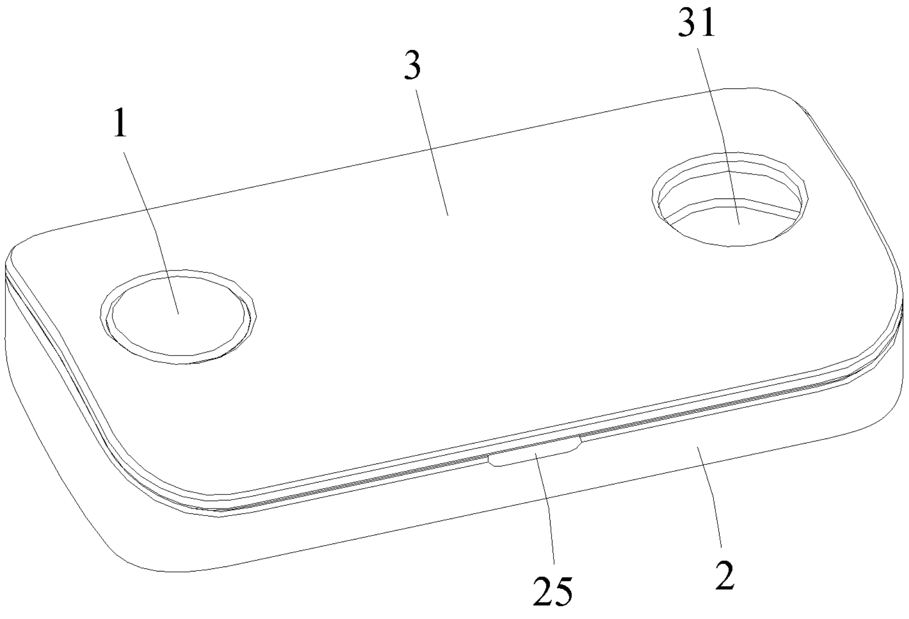
FIG. 5 is a structural schematic diagram of a headset kit provided by the second embodiment of the present disclosure.
Figure 6:
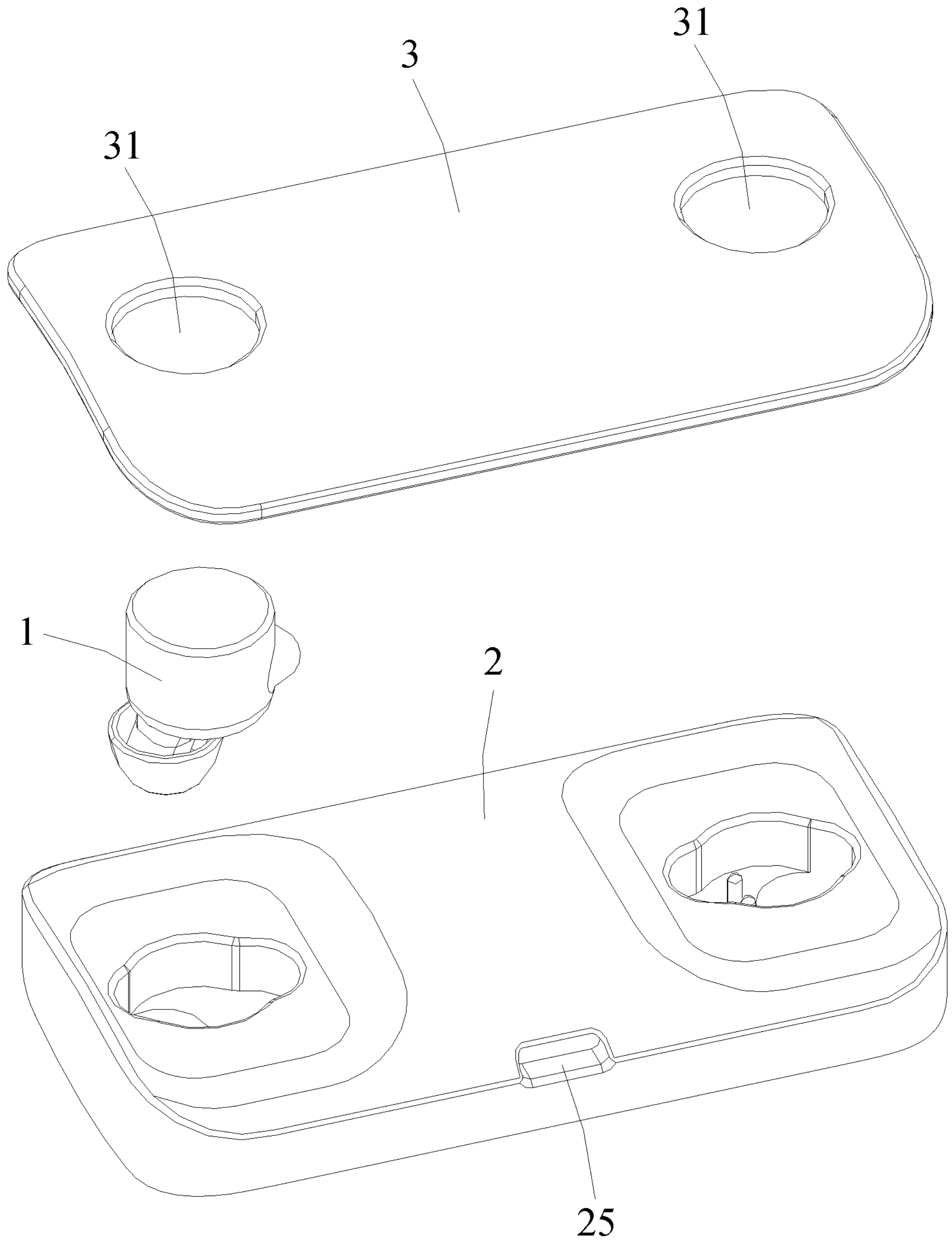
FIG. 6 is an explosive schematic diagram of a headset kit provided by the second embodiment of the present disclosure.
Figure 7:
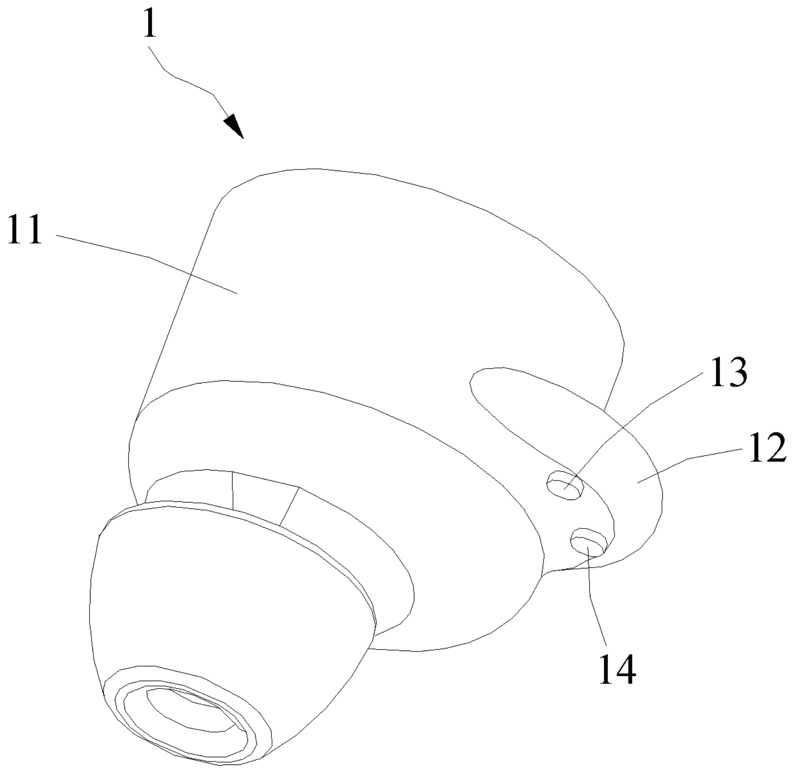
FIG. 7 is a structural schematic diagram of a Bluetooth earphone provided by the second embodiment of the present disclosure.

Further, referring to FIG. 5 and FIG. 6 together, as a specific embodiment of an headset kit provided by the second embodiment of the present disclosure, the number of the Bluetooth earphones 1 is two, the number of the through holes 31 is also two, one side of each Bluetooth earphone 1 extends into the corresponding opening 26 and can be flush with the open end face of the opening 26, and the other side of each Bluetooth earphone 1 extends into the corresponding through hole 31 and can be flush with the open end face of the through hole 31. According to the structure, the Bluetooth earphones 1 can be independently contained conveniently, operation is convenient and fast, and the thickness is small.

Embodiment III

Referring to FIG. 9 to FIG. 12 together, a headset kit provided by the third embodiment of the present disclosure is described as follows. The headset kit comprises a charging base 2, a first accommodating groove 211 for supporting an earphone main body 11 and a second accommodating groove 212 for supporting an earphone arm 12 are formed in the charging base 2, the first accommodating groove 211 communicates with the second accommodating groove 212, and the bottom surface of the first accommodating groove 211 and the bottom surface of the second accommodating groove 212 are located on the same plane. An opening 26 is formed in the bottom surface of the first accommodating groove 211, and one end of the earphone main body 11 can extend out of the opening 26; and a positive plate 22 and a negative plate 23 are arranged on the bottom surface of the second accommodating groove 212 and can be respectively connected with a positive electric conductor 13 and a negative electric conductor 14 on the Bluetooth earphone 1.

A base plate 4 is arranged at the bottom of the charging base 2, the upper end of the Bluetooth earphone 1 is flush with the upper end of the charging base 2, and the lower end of the Bluetooth earphone 1 extends out of the lower end of the charging base 2 by 1-3 mm. The extended part of the earphone main body 11 can be covered with the base plate 4. The base plate 4 may be integrally formed with the charging base 2, or bonded to the charging base 2, without being exclusively limited herein.

According to the third embodiment, part of the earphone main body 11 extends out of the charging base 2, and the first accommodating groove 211 and the second accommodating groove 212 for supporting the Bluetooth earphone 1 are directly formed in the charging base 2, so that the structure of the upper cover 3 can be canceled, and the overall thickness of the headset kit is matched with the thickness of the earphone main body 11. The overall thickness of the product produced through the present disclosure can be reduced by 9-12 mm, and the product is smaller in thickness and convenient to carry.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A headset kit, comprising:
- at least one Bluetooth earphone;
- a charging base used for charging each Bluetooth earphone; and
- an upper cover connected with the charging base, wherein the upper cover is matched with the charging base to support the each Bluetooth earphone,
- wherein supporting grooves for supporting a first side of the each Bluetooth earphone are formed in the charging base, and through holes used for a second side of the each Bluetooth earphone to extend into the through holes are formed in the upper cover.

2. The headset kit according to claim 1, wherein positioning grooves for positioning and pressing the each Bluetooth earphone at positions corresponding to edges of the through holes are formed in the upper cover.

3. The headset kit according to claim 1, comprising two Bluetooth earphones, the through holes are in a long strip shape, and two ends of the through holes extend to corresponding positions of the two Bluetooth earphones respectively.

4. The headset kit according to claim 1, comprising two Bluetooth earphones, and the through holes are formed in the upper cover at positions corresponding to the two Bluetooth earphones, respectively.

5. The headset kit according to claim 1, wherein the upper cover is detachably connected with the charging base, and an avoiding groove is formed in an edge of the charging base.

6. The headset kit according to claim 1, wherein the each Bluetooth earphone comprises an earphone main body and an earphone arm connected with the earphone main body, and each supporting groove comprises a first accommodating groove for supporting each earphone main body and a second accommodating groove for supporting each earphone arm.

7. The headset kit according to claim 6, wherein a side surface, facing the upper cover, of the charging base is provided with a protrusion extending in a direction of the upper cover, and the second accommodating groove is formed in the protrusion.

8. The headset kit according to claim 6, wherein an opening is formed in a bottom surface of the first accommodating groove and the earphone main body extends into the opening.

9. The headset kit according to claim 8, further comprising a base plate, wherein one side of each opening is covered with the base plate, and the base plate is connected with the charging base.

10. The headset kit according to claim 6, wherein the first accommodating groove communicates with the second accommodating groove, and a bottom surface of the first accommodating groove and a bottom surface of the second accommodating groove are located on a same plane.

* * * * *